United States Patent
Zabaluev et al.

(10) Patent No.: US 10,530,876 B2
(45) Date of Patent: Jan. 7, 2020

(54) SYSTEM AND METHOD FOR MANAGING THEMATIC INFORMATION AGGREGATIONS

(71) Applicant: Red Trex Limited, Aglantzia (CY)

(72) Inventors: Sergey Zabaluev, Riga (LV); Avi (Avraham) Shaked, Tel Aviv (IL)

(73) Assignee: Com Tec Co Technologies Ltd., Nicosia (CY)

( * ) Notice: Subject to any disclaimer, the term of this patent is extended or adjusted under 35 U.S.C. 154(b) by 563 days.

(21) Appl. No.: 14/493,412

(22) Filed: Sep. 23, 2014

(65) Prior Publication Data

US 2016/0088102 A1    Mar. 24, 2016

(51) Int. Cl.
| | |
|---|---|
| H04L 29/08 | (2006.01) |
| H04L 12/24 | (2006.01) |
| G06F 3/0482 | (2013.01) |
| G06F 3/0484 | (2013.01) |
| G06F 3/0486 | (2013.01) |

(52) U.S. Cl.
CPC ............ *H04L 67/22* (2013.01); *G06F 3/0482* (2013.01); *G06F 3/0486* (2013.01); *G06F 3/04842* (2013.01); *H04L 41/22* (2013.01)

(58) Field of Classification Search
CPC .. G06F 3/0482; G06F 3/04842; G06F 3/0486; G06Q 10/10; H04L 41/22; H04L 67/22
See application file for complete search history.

(56) References Cited

U.S. PATENT DOCUMENTS

| | | | | |
|---|---|---|---|---|
| 8,122,070 B1* | 2/2012 | Eshkenazi | ......... | G06F 17/30011 707/822 |
| 9,223,461 B1* | 12/2015 | Brown | ................. | G06F 3/0485 |
| 9,331,973 B1* | 5/2016 | Kristinsson | ............. | H04L 51/32 |
| 9,405,830 B2* | 8/2016 | Macadaan | ............. | G06F 3/0482 |
| 2006/0080415 A1* | 4/2006 | Tu | ....................... | H04L 67/1095 709/220 |

(Continued)

OTHER PUBLICATIONS

Sauermann et al, "Overview and Outlook on the Semantic Desktop", Knowledge Management Department, Semantic Desktop at the ISWC 2005 conference, CEUR workshop proceedings, Nov. 30, 2005, vol. 175, pp. 1-18.

Woerndl et al, "SeMoDesk: Towards a Mobile Semantic Desktop" Dec. 31, 2008, Retrieved from URL: http://www.researchgate.net/profile/Maximilian_Waehrl/pubilication/228963341_SeMoDesk_Towards_a_Mobile_Semantic_Desktop/links/0a85e5374f99692e29000000.pdf pp. 1-7.

(Continued)

*Primary Examiner* — Andrea N Long
(74) *Attorney, Agent, or Firm* — Pearl Cohen Zedek Latzer Babatz LLP

(57) ABSTRACT

Data processing systems, user interfaces and methods are provided, which allow a user to select information sources, to rearrange associations between links to content items in the information sources and thematic information aggregations including the links and to access any of the information sources via the thematic information aggregation which contains the respective link. The user interface may be graphic, highly interactive, user-modifiable and zoomable, and implement elements of semantic analysis to allow the user arrange multiple content items from various sources into thematic information aggregations sharing unified interface, using only links to the content items. The thematic information aggregations may be synchronized across user devices and user statuses may be preserved.

23 Claims, 8 Drawing Sheets

(56) References Cited

U.S. PATENT DOCUMENTS

| | | | |
|---|---|---|---|
| 2006/0159109 A1* | 7/2006 | Lamkin | G06F 17/30174 370/401 |
| 2007/0226204 A1* | 9/2007 | Feldman | G06F 17/30958 |
| 2008/0307343 A1* | 12/2008 | Robert | G06F 3/04817 715/765 |
| 2010/0262928 A1* | 10/2010 | Abbott | G06F 3/04817 715/769 |
| 2013/0151948 A1* | 6/2013 | Khalil | G06F 17/3089 715/234 |
| 2014/0040714 A1* | 2/2014 | Siegel | G06F 17/212 715/203 |
| 2014/0244618 A1 | 8/2014 | Lynch et al. | |

OTHER PUBLICATIONS

Sintek et al. "Technologies for the Social Semantic Desktop", Aug. 30, 2009, Reasoning Web. Semantic Technologies for Information Systems, Springer Berlin Heidelberg, Berlin Heidelberg, pp. 222-254.

Lica, "The Road to the Ideal Social Content Aggregator; Content Aggregation Changing Trends", Sep. 3, 2008, Retreived from URL: http://web.archive.org/web/20080906005618/http://www.ewriting.pamil-visions.com/2008/09/03/content-aggregation pp. 1-8.

European Search of European Application No. EP 15 18 3335 dated Jan. 25, 2016.

\* cited by examiner

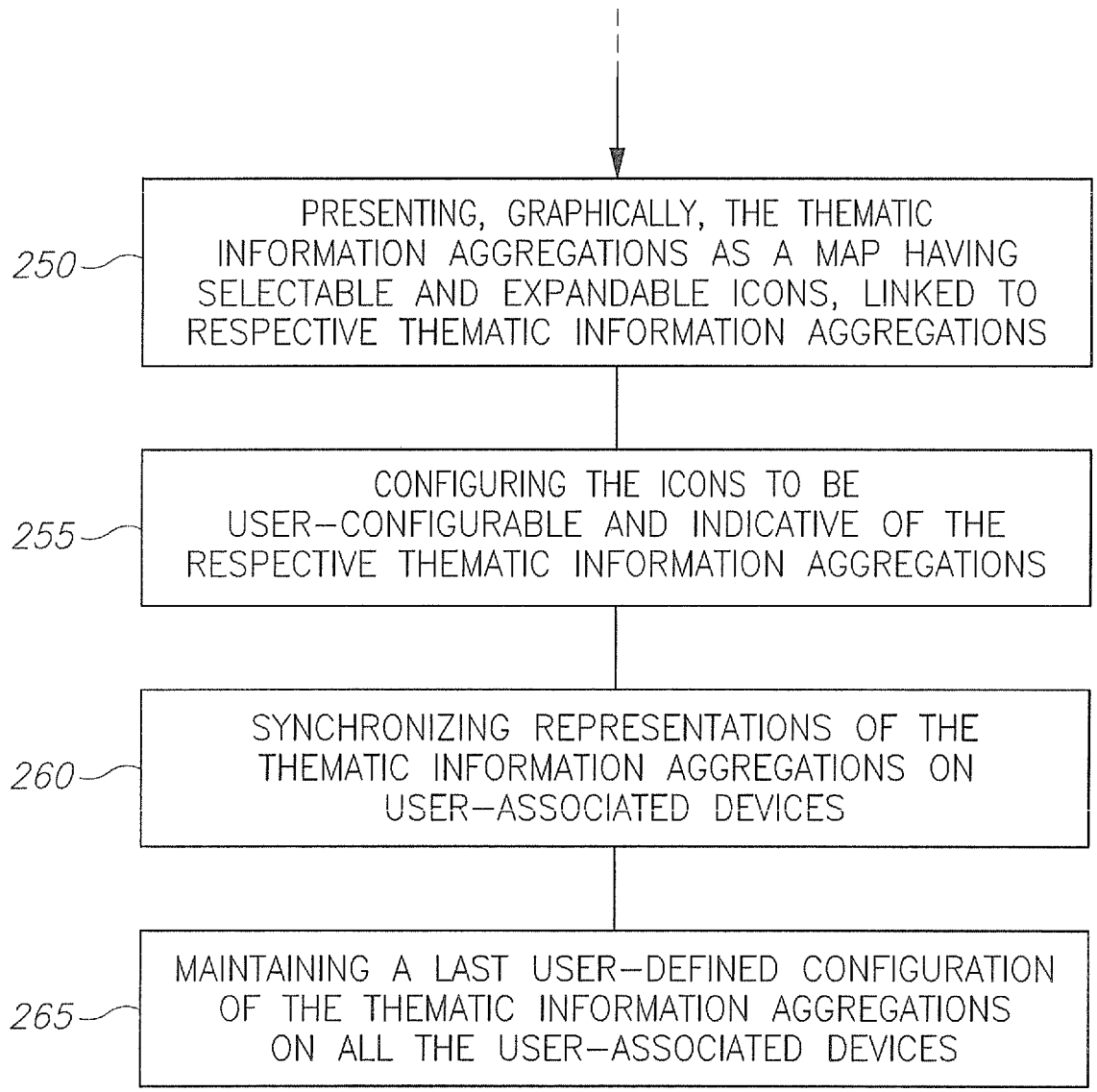
Figure 5 (cont. 1)

SYSTEM AND METHOD FOR MANAGING THEMATIC INFORMATION AGGREGATIONS

BACKGROUND OF THE INVENTION

1. Technical Field

The present invention relates to the field of data management systems, and more particularly, to systems and user interfaces that manage thematic information aggregations.

2. Discussion of Related Art

Information sources become ever more versatile and dynamic, and the user faces the challenge of handling all the available information. Current content management systems make data from various sources available to a user, who is allowed to manipulate and monitor data usage.

SUMMARY OF THE INVENTION

One aspect of the present invention provides a user interface may include a plurality of thematic information groups or aggregations, each including plurality of links to content items associated with a plurality of respective information sources, wherein the user interface is configured to allow a user to select a content item from the information sources, to add a link to the selected content item to the thematic information aggregations and to access any of the content items via the thematic information aggregation which contains the respective link.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1A:
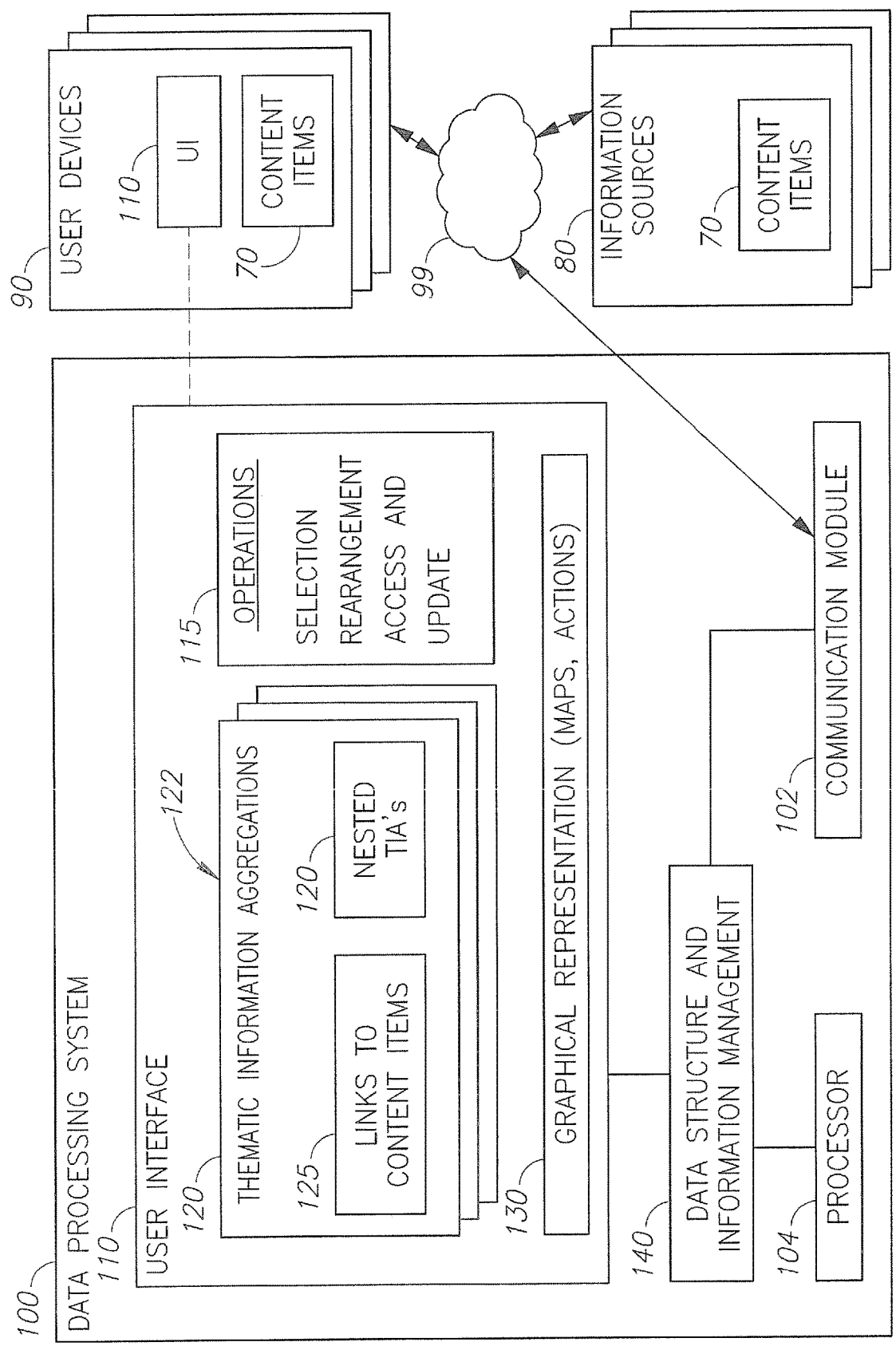
FIG. 1A is a high level schematic illustration of a data processing system and user interface in their context, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

Before at least one embodiment of the invention is explained in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Prior to the detailed description being set forth, it may be helpful to set forth definitions of certain terms that will be used hereinafter.

The term "thematic information group or aggregation" (TIA) as used in this application refers to a data construct including a plurality of links to content items, all of which united and organized by a user according to user preferences. As used herein, organizing may refer to any action of creating TIAs, placing content items (by placing links thereto) within the TIAs, selecting icons for TIAs and content items, and any action related to arrangement of content items within TIAs and the visual representation thereof. For example, a user may organize TIAs according to topics. Thus, content items of various formats which, according to the user, are related to the same topic will be associated to a single TIA. Different TIAs may be related to different aspects of personal or professional life: for example, projects, trips, business, research, etc. The content items may be located at a plurality of information sources and may include virtually any type of digital content in any applicable format e.g., text, audio images, video, addresses, contacts, profiles, documents, notes, tasks, correspondence items such as e-mail messages, web (Internet) related information sources such as web bookmarks or web pages and online resources, presentations, pdf files, files of any type, folders, etc. The information sources may include any digital information source, internal or external, such as the hard drive of the user, other computers or servers, various service providers, storages providers such as Dropbox®, Google Drive®, OneDrive®, Evernote® the world wide web (the internet), social networks such as Facebook®, Linkedin®, Twitter®, Instagram® or any other database, e-mail server software, calendar software, etc. Thus, digital content of different formats, located at different locations, may be organized by the user at TIAs at a single location, managed as a common extensible model, providing a unified presentation and easy access to the various content items. The common extensible model may include a plurality of TIAs with links to a variety of information items as described herein, and may optionally include a hierarchy of TIAs, e.g., TIAs may be nested within parent TIAs. Nested TIAs may be referred to herein as sub-TIAs. Information sources may include many content items that are saved and organized by the information source in data structures that may be unique to the information source. Thus, according to prior art, content items of the information source may be accessed by that information source only and not by others. For example, e-mail messages received by an e-mail software, e.g., Microsoft Outlook®, may be accessed only by that e-mail software and not, for example, by general filing viewing system.

Embodiments of the present invention may allow a user to organize information items from various information sources and handle the information items in an intelligible way, combine information items from various information sources at one convenient location, and afterwards manipulate and interact with the information easily. For example, people are using various sources of information in their day-to-day life, both for personal and professional purposes. E-mails, documents, notes, pictures, videos, web content, etc. are distributed between all sorts of different tools and solutions, such as Google Drive®, Dropbox®, Instagram®, Evernote®, and also stored locally on personal devices of the user. The same holds for the professional and enterprise environment: e-mails, documents, reports, contacts, client information, line-of-business data, other types of information are distributed across different systems, both cloud-based and local, from different vendors, e.g., Sharepoint®, Documentum®, Microstrategy Reporting®, Salesforce CRM®, to name a few.

According to embodiments of the present invention data processing systems, user interfaces and methods are provided, which allow a user to select content items from various information sources, to add a link to a selected content item to the thematic information aggregations, to organize the content items in thematic information groups or aggregations and access any of the content items in any of the information sources via the thematic information aggregation which contains a respective link to each content item. As used herein accessing a content item may include viewing, changing, performing actions or otherwise manipulating and interacting with the content item. The user interface may be graphic, highly interactive, user-modifiable and zoomable, and implement elements of semantic analysis to allow the user to organize multiple content items from various information sources into thematic information aggregations sharing unified interface, using only links to the content items. According to some embodiments user state may be preserved on a single device or across devices. Preserving the user state may include preserving the last navigation state and/or appearance of the system. For example, the last visual point of navigation of a user in a TIA may be preserved. The thematic information aggregations may be synchronized across user devices, thus updates carried out on one device may be updated at the other devices. Synchronization may include transferring the state of thematic information aggregations as well as the user state from one user device to other user devices where the thematic information aggregation software is installed, so that when a user makes changes on one device the respective modifications are made available on other user devices. The implementation of synchronization can vary depending on the context, and can be for example backend server-based or peer-to-peer.

The system and interface according to embodiments of the present invention may bring together various information items from different information sources, custom or standard, either locally accessible or remote, for the subsequent manipulations and interaction, providing fully aligned look-and-feel and user experience for the information, and uniform look and feel and user experience for the solution overall.

The system and interface according to embodiments of the present invention may be configured to utilize ideas and techniques from the semantic desktop approach, in which content is arranged and interpreted as Semantic Web resources, each is identified by a Uniform Resource Identifier (URI) and all data is accessible and queryable as Resource Description Framework (RDF) graph and form zoomable User Interfaces (ZUI), in which information elements appear directly on an infinite virtual desktop (e.g., using vector graphics) and users are allowed to pan across the virtual surface in two dimensions and zoom into objects of interest, wherein more details are displayed.

Furthermore, certain embodiments of the invention achieve convenient usage of different types of personal information together, setting a base for the effective search across different types of information, information relationship management—linking information to each other and effective information sharing.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1B:
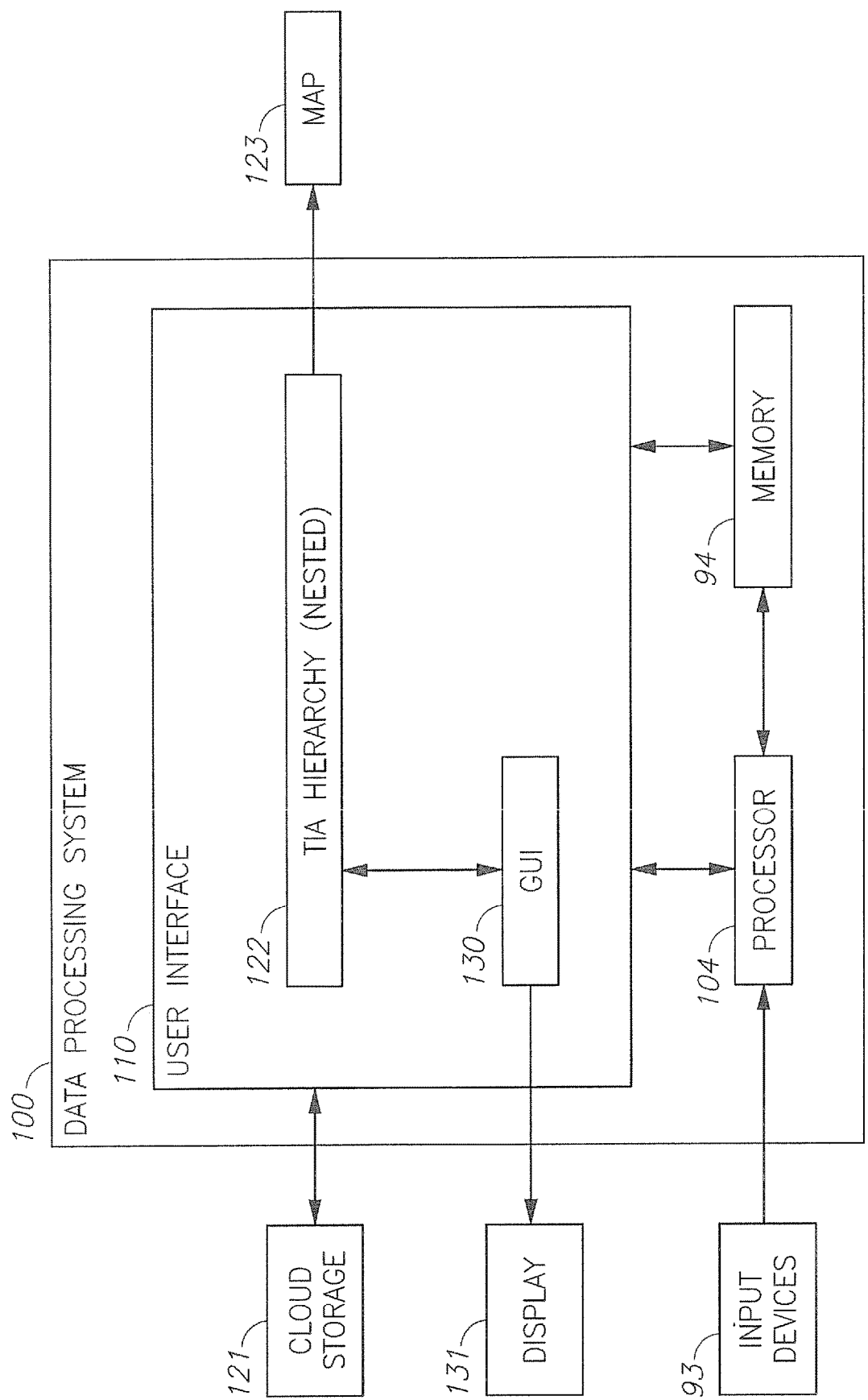
FIG. 1B is a high level schematic illustration of the data processing system, according to some embodiments of the invention.
Figure 2:
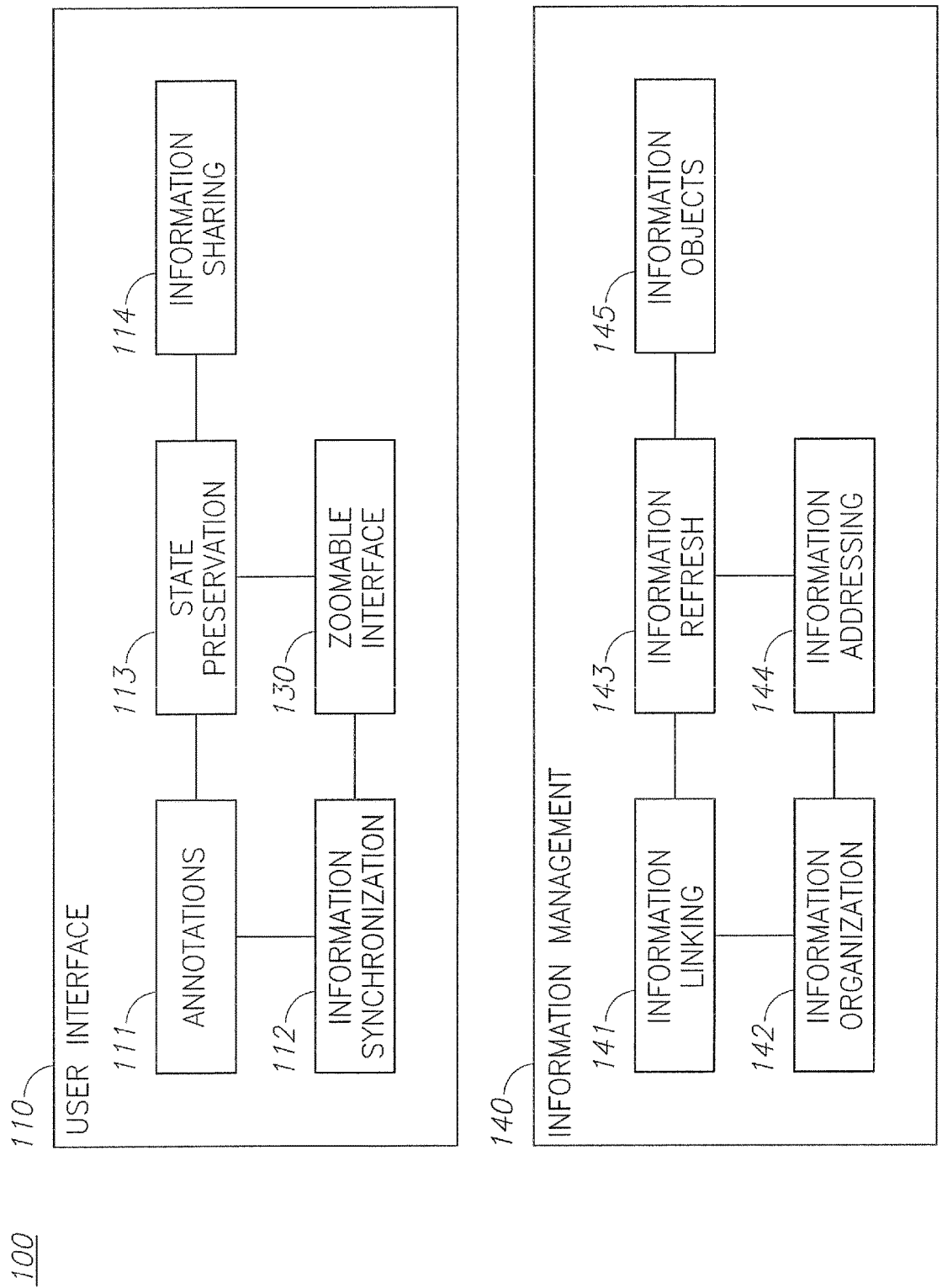
FIG. 2 is a high level schematic illustration modules (functional components) of the user interface and of the data structure and information management module in the data processing system, according to some embodiments of the invention.
Figure 3:
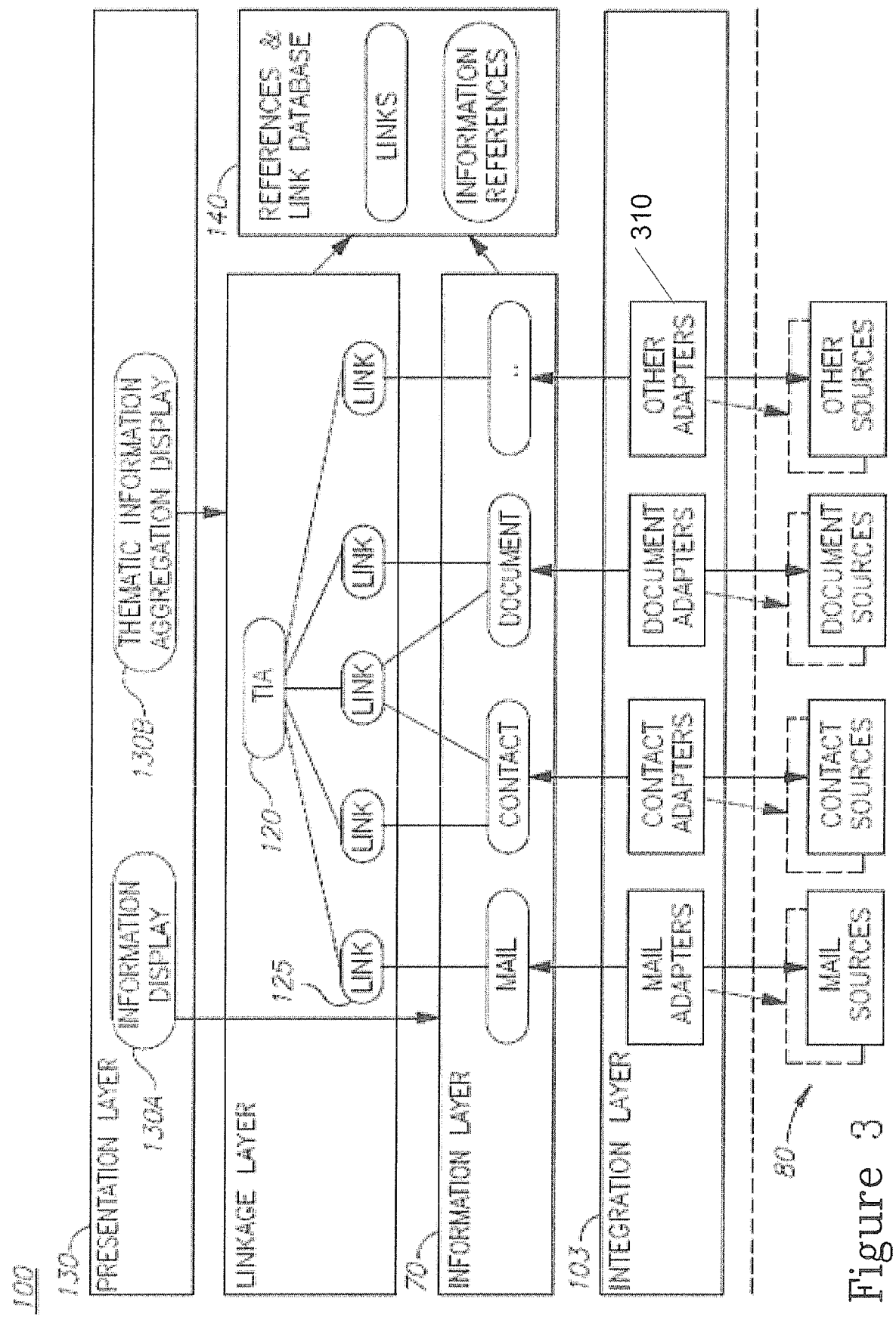
FIG. 3 is a high level schematic illustration of the logical architecture system in a layered structural view which underlines system hierarchy with respect to handing the content items from the information sources, their links and generally the information linking in the system, according to some embodiments of the invention.

FIGS. 1A, 1B, 2 and 3 are high level schematic block diagrams of a data processing system 100 and a user interface (UI) 110, according to some embodiments of the invention. System 100 and/or user interface 110 may be partially or fully implemented using computer hardware. FIG. 1A is a high level schematic illustration of data processing system 100 and user interface 110 in their context, FIG. 1B is a high level schematic illustration of data processing system 100, according to some embodiments of the invention, FIG. 2 schematically illustrates modules (functional components) of user interface 110 and of data structure and information management module 140 in data processing system 100 and FIG. 3 is a schematic illustration of the logical architecture of data processing system 100 in a layered structural view which underlines system hierarchy with respect to handing content item 70 from information sources 80, their links 125 and generally the information linking in system 100 (see TIA hierarchy 122 in FIGS. 1A, 1B). Thematic information aggregations 120 may include hierarchy 122 of nested sub-aggregations 120, and the user may be allowed to access any of sub-aggregations 120 via an aggregation in which it is nested.

Data processing system 100 may be connected via respective communication links 99 to a plurality of information sources 80 and to a plurality of devices 90 associated with a user, e.g., via a communication module 102. Data processing system 100 may be arranged to operate or provide, on each of devices 90, user interface 110. Data processing system 100 may further include a computer processor 104 for executing or running at least some of the system's functions. FIG. 1B schematically illustrates TIA hierarchy 122 interacting with graphical user interface (GUI) 130 and representable thereby as a map 123, within user interface 110 as part of data processing system 100 which further includes a processor 104 and a memory 94 and interacting with input device(s) 93 such as a mouse, keyboard, touchscreen etc., display(s) 131 and possibly cloud storage resources 121. Devices 90 may be any applicable computing devices, for example, a smartphone, a personal computer, a desktop computer, a mobile computer, a laptop computer, a notebook computer, a terminal, a workstation, a tablet computer or any other suitable computing device. Processor 104 may be configured to carry out methods disclosed herein by for example executing software or code stored in memory 94.

User interface 110 may include a plurality of thematic information groups or aggregations (TIAs) 120, each including a plurality of links 125 to content items 70 associated with a plurality of respective information sources 80 (external, e.g., on web servers or internal, e.g., on one of user's devices 90). User interface 110 may be configured to, for example, allow a user to (i) select information sources 80, (ii) select content items 70 from the information sources 80, (iii) organize the selected content items 70 in thematic information aggregations 120 according to the user preferences and (iv) access the selected content items 70 at information sources 80, via links 125 provided at thematic information aggregation 120. User interface 110 may be arranged to support a plurality of actions or operations 115, such as selection of content items 70 and links 125, organization of thematic information aggregations 120, accessing content items 70, etc.

Data processing system 100 may be further arranged to synchronize across user devices 90 a most recent or last user-defined configuration of TIAs 120, as organized by the user on a last-used device 90. Thus, a most recent or last user-defined configuration of TIAs 120 may be stored or maintained on all user devices 90.

Data processing system 100 may further include a GUI 130 of TIAs 120, e.g., as maps 123, possibly zoomable (e.g., see below) with representations of content items 70, an action menu (e.g., context related menus) etc. Thematic information aggregations 120 may be graphically presented on user interface 110, e.g., as a map 123 (FIG. 1B) having a plurality of selectable and expandable icons (see e.g., in FIGS. 4A, 4B), associated with respective thematic information aggregations 120. The icons may be user-configurable and indicative of respective thematic information aggregations 120.

In certain embodiments, thematic information aggregations 120 may include hierarchy 122 of nested sub-TIAs 120 (see nested TIAs 120 in FIG. 1A, building TIA hierarchy 122), and user interface 110 may be further configured to allow the user to access any of sub-TIAs 120 via aggregation 120 in which it is nested. By selecting a sub-TIA 120, a graphical representation of the selected TIA 120 may be graphically presented on GUI 130, allowing the user to perform operations on the selected sub-TIAs 120 or further select a second sub-TIA 120, etc.

As illustrated in FIG. 2, user interface 110 may include various annotations 111 relating to content items 70 or TIAs 120, information synchronization parameters 112, state preservation parameters 113, information sharing 114, as well as GUI 130, which may be zoomable (see example below). Annotations 111 on user interface 110 may be represented with visual annotations, such as lines, highlights, text notes, arrows, boxes, circles or other graphical annotation representations, as well as bookmarks provided by a user as a visual overlay on top content items 70 or TIAs 120. Annotations 111 may be viewed, modified, and deleted by a user. Information synchronization parameters 112 may include parameters related to TIA versions and content item updates on different devices 90, and may include visual or other indicators of the synchronization status of TIAs 120, links 125 and content items 70, as well as user interface elements allowing a user to control and view the status of synchronization of TIAs 120, links 125 and content items 70 between user devices 90, and control and view the status of synchronization of TIAs 120, links 125 and content items 70 with the information sources 80. State preservation parameters 113 may include parameters related to the navigation state and the history of navigation within user interface 110, for example (but not limited to) last page opened by a user in a document or any other content item 70, last visual point of navigation of a user in TIAs 120, etc. Information sharing module 114 may include rules and respective information which may allow a user to control sharing of TIAs 120, links 125 and content items 70 with one or many other users, in read-only or read-write mode, as well as view TIAs 120, links 125 and content items 70 shared by others with him/her. A user may initiate sharing of TIAs 120, links 125 or content items 70, view the detailed information about the sharing, define access restrictions on the sharing or cancel the sharing. Zoomable GUI 130 may include capabilities to view in multiple zoom levels the visual representations of TIAs 120 and content items 70 connected to them via links 125, switch between different zoom levels of visual representations of TIAs 120 and content items 70. For example, a text object may be represented as a small dot at a first zooming level, and upon progressive zooming as a thumbnail of a page of text, as a full-sized page and finally as a magnified view of the page. GUI 130 may include capabilities to organize TIAs 120 and content items 70 by adding content items 70 from connected information sources 80 to TIAs 120, removing content items 70 along with respective links 125 from TIAs 120, and visually arranging content items 70 in TIAs 120 by changing the size and visual placement of content items 70.

Data processing system 100 may further include data structure and information management module 140 configured to maintain the respective data structures and manage information in system 100 and in devices 90. Data structure and information management module 140 may include an information linking module 141 arranged to manage links 125 and their association with information sources 80, an information organization module 142 and information refresh module 143, both associated with information sources 80 and configured to perform user initiated modifications of information and linking, an information addressing module 144 arranged to handle the complex linking and updating issues, and the actual information objects 145.

As illustrated in FIG. 3, GUI 130 may include displayed TIAs 130B and displayed information 130A related to content items 70 and possibly also to TIAs 120 and/or operative elements of user interface 110. Displayed TIAs 130B represent thematic information aggregations 120 themselves, which aggregate links 125, at a linkage layer, to various content items 70 at the information layer. The linkage layer and the information layer are associated and managed by data structure and information management module 140. System 110 further includes an integration layer 103, which may be associated with both communication module 102 and data structure and information management module 140, including various information adapters 310 configured to handle respective information sources 80 and/or content items 70, such as various providers, servers and applications. The information adapters 310 may be the connection point between the information sources 80 and the TIAs 120, and may be configured to have an interface that enables access to content items 70 within their respective information sources 80. For example, a specific information source 80 may organize content items 70 is a certain manner. The information adapter 310 of that information source 80 may be configured to be able to access content items 70 within information source 80, e.g., based on prior knowledge of the information structure of information source 80.

Furthermore, system 100 and interface 110 may handle diverse information types of different information sources 80, may aggregate the information and may allow the user to organize the information conveniently at TIAs 120 at a single location. Users may have as many TIAs 120 as necessary and may access them both being online and off-line. System 100 implements the information homogenously and represents it by a common extensible model. The common extensible model may use information adapters 310 when linking information from the plurality of information sources 80 to provide presentation and access to the various content items 70.

Figure 4A:
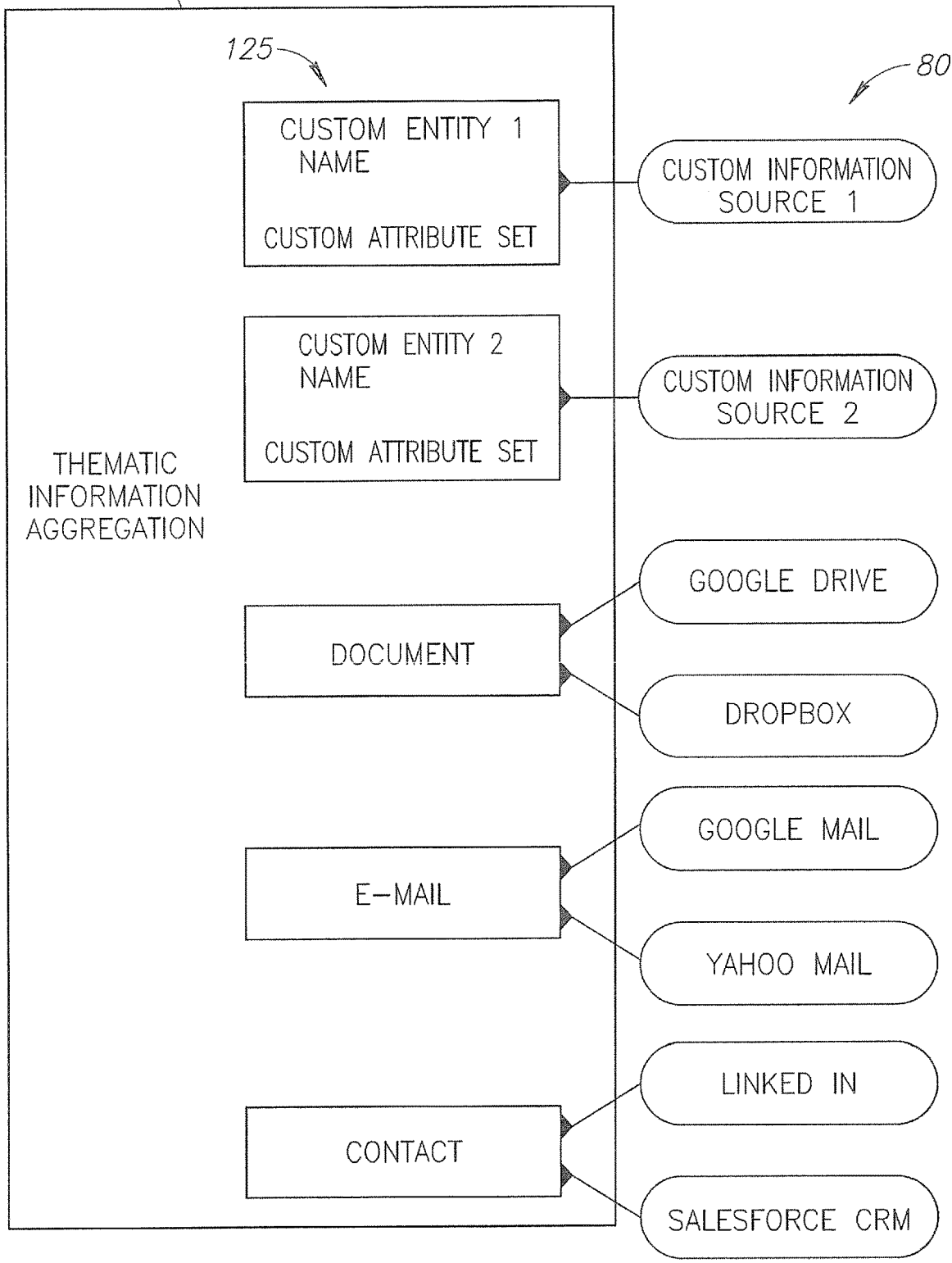
FIGS. 4A and 4B are schematic exemplary illustrations of information aggregation and management in the system, according to some embodiments of the invention.
Figure 4B:
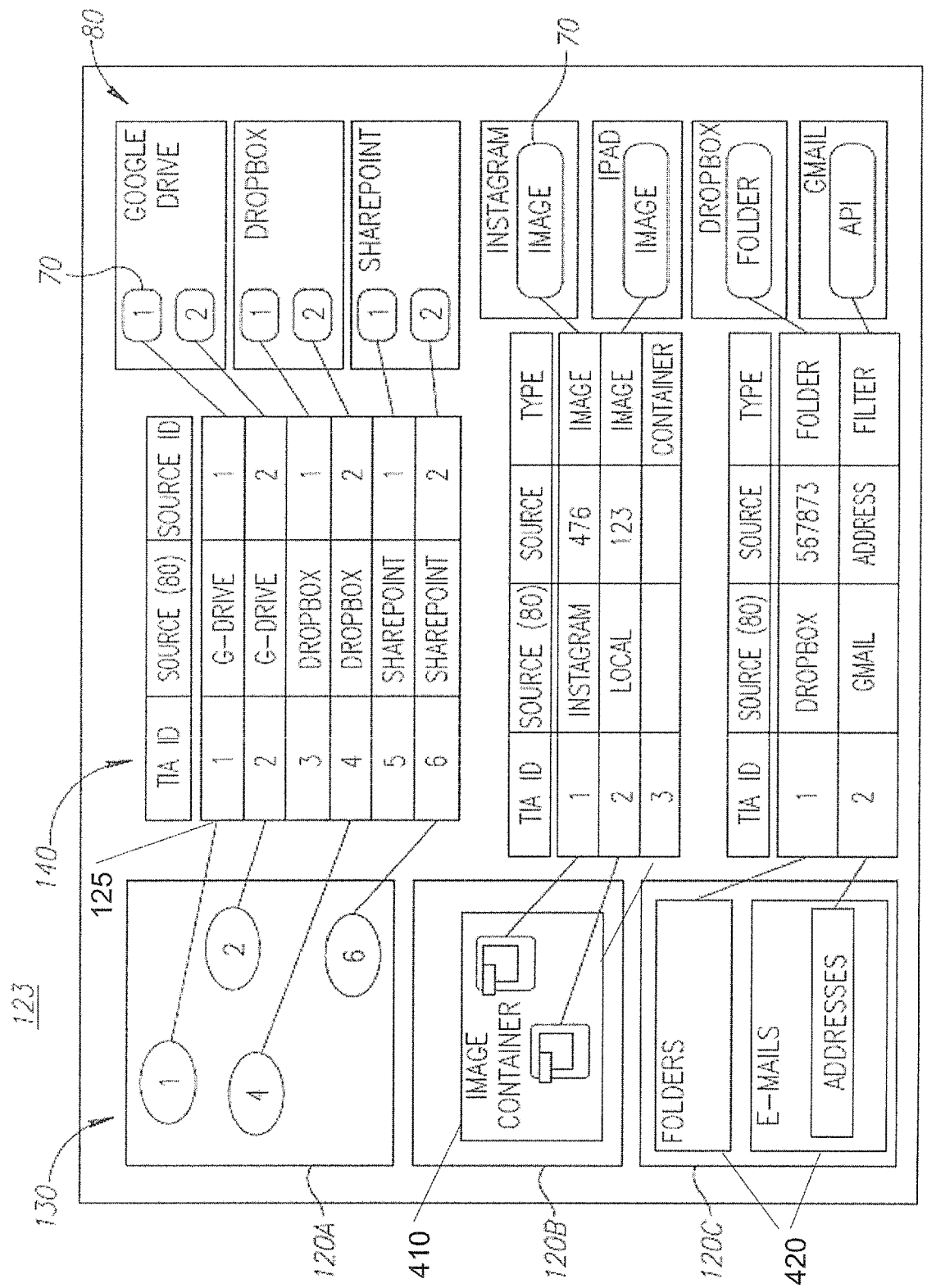

FIGS. 4A and 4B are schematic exemplary illustrations of information aggregation and management in system 100, according to some embodiments of the invention.

In the example illustrated in FIG. 4A, a thematic information group or aggregation 120 is visually represented (e.g., via GUI 130), e.g., as map 123, on user interface 110, including links 125 to content items 70, e.g., customizable entities, documents, e-mail messages, contacts etc. within respective information sources 80 such as servers of various service providers for content, social networks, mail servers etc.

In the example illustrated in FIG. 4B, GUI 130 on user interface 110 may include multiple thematic information groups or aggregations 120A, 120B, 120C (simultaneously or alternatively). Data structure and information management module 140 may link respective icons presented in GUI 130 with respective content items 70 and information sources 80. Data structure and information management module 140 is illustrated in FIG. 4B schematically and in a non-limiting manner in form of a table.

Each content item 70 in TIAs 120A, 120B, 120C may have a unique identifier (ID), referred to herein as TIA ID to identify the content item 70 within that TIA. The TIA ID may allow using of content items 70 without any relevance to the information source 80. Content items 70 in TIA 120A may be individual content items e.g., a single file, contact from Linkedin, a single e-mail message, etc. in TIA 120B content items 70 may be organized in containers 410 which may obtain their own TIA ID and include a plurality of content items 70. In TIA 120C content items 70 may include dynamic content items 420, e.g., content items that are selected dynamically according to a predefined criteria. For example, dynamic content items 420 may include a plurality of files located in a folder in information source 80, or a plurality of e-mails from an e-mail address. Thus, dynamic content items 420 may automatically filter e-mail messages according to predefined rules. A specific content item 70 may be included within more than one TIA 120 and its item parameters may be preserved across TIAs 120 or devices 90.

Data structure and information management module 140 may preserve for each TIA 120A, 120B, 120C a table of links 125, linking TIA IDs of content items 70, with their respective information source 80 and their ID within information source 80, referred to herein as source ID. Each link 125 may be presented in FIG. 4B as an entry or a row in the table including TIA IDs of an content item 70, its respective information source 80 and its source ID. The table may include other parameters related to each content item 70 such as the type of content item 70 (e.g., is it a file, e-mail message, image, etc.).

According to embodiments of the present invention, data processing system 100 and user interface 110 may be configured to provide any of the following functionalities and operations: user interface indications of a current position on map 123 of TIA hierarchy 122 (e.g., displayed as a grid); representing single pages of a multipage document as multiple objects; smart interaction between objects; web links to be uploaded beyond textual; optional insertion of videos (e.g., Youtube clips); ability to download information from the GUI 130; large or unlimited number of information sources; separate layer for annotations (separate from the objects); support of containers 410 (multilevel folders); object overlapping; internal scrolling in previews; drag and drop uploads; PDF page cropping; zoom and panning within the GUI 130; Linear layout and auto-saving.

Thus, system 100 and interface 110 may be configured to provide a place where a user can view and access a plurality of types of digital content and visually organize content items 70 into TIAs 120 according to the user preferences. Content items 70 may be fully interactive. Users may view pictures, read and annotate documents, open web bookmarks, view contact details, read email, edit notes, create tasks, etc. Content items 70 may be live, e.g., substantially always connected to their information source 80, so that the content may be refreshed automatically or on-demand. System 100 and interface 110 may support offline mode, caching requested content items 70 on device 90, in order to support uninterrupted and consistent availability of content item 70, even when system 100 is not connected to information source 80 of the content item 70. System 100 and interface 110 may be configured to allow a user to create different TIAs 120 and to allow quick convenient switching between different TIAs 120, supporting state preservation (e.g., memorization of the exact place in TIA 120 the user was in before leaving it). System 100 and interface 110 may provide natural interaction with the information, e.g., enable placing on GUI 130 various content items 70 anywhere, resizing content items 70, moving around content items 70, organizing content items 70 into containers 410 (e.g., folders, possible multi-leveled) and zooming into TIAs 120, providing more and more details as the zooming proceeds.

System 100 and interface 110 may be configured to represent information from different information sources 80 in a user selected manner in TIAs 120, which is not necessarily related to the representation at information source 80. System 100 and interface 110 may allow linking content items 70 from different information sources 80. Links 125 as well as links between or among content items 70 may be stored on device 90 and propagated to a centralized private cloud, for future synchronization between different devices 90 of the user.

according to embodiments of the present invention, system 100 and interface 110 may be configured to exhibit for example, the following characteristics:

Information universality—the extensible information model is not limited to specific or predefined types of content items 70. Rather, it provides a way to add new information types to TIA 120; Content items 70 of any types may be selected by the user and linked to TIAs 120.

Information versatility—structured and non-structured information is supported, ranging from pictures to notes, from entities from custom business systems to reports;

Information addressability—each content item 70 may be uniquely identified and tracked back to the information source 80, e.g., by data structure and information management module 140 as explained herein. Thus, content items 70 are not necessarily copied into TIAs 120, but rather linked to information sources 80, with non-ambiguous indication of where the content item 70 comes from;

Information vividness—information items 70 that are linked and not copied are live: e.g., linked content items 70 refresh as soon as the original information item has been modified;

Information interactivity—the user may perform standard actions with content items 70, such as: read/annotate documents, view images, modify chart filtering criteria, send e-mail to contacts, close tasks, etc.;

Information organization—the user may have on TIA 120 individual content items 70, a plurality of content items 70 in containers 410, or dynamic views that retrieve and refresh content items 70 based on predefined criteria;

Information linking—content items 70 can not only be located at TIA 120, they can also be linked to other content items 70, at the same TIA or at other TIA. Linking content items 70 to each other does not imply any content, only linkage is stored and may be visually presented to the user. Linkage between content items 70 may be synchronized across devices 90, which also enforces information privacy;

Information privacy—content items 70 may either stay in the original information source 80, or be copied to device 90 for performance/offline usage reasons; no external content may be stored in a TIA. This way, in some embodiments, information privacy concept is not compromised.

Inter-device synchronization—TIAs 120 may be synchronized across devices 90 of the user, e.g., changes to TIAs 120 made in one device 90, are reflected on other devices 90 transparently;

State preservation—when the user exists TIA 120, all information items stay as they were when the user was viewing them, e.g., if a document was opened, a current page of the document is saved, images size and zoom is preserved etc., and the state may be synchronized across devices 90;

Annotation capabilities—the user may draw annotations over content items 70 or over TIAs 120;

Smart interaction between objects—system 100 may be configured to perform sets of actions when content items 70 are dragged at each other according to smart object interaction rules, e.g., dragging a document to a contact may send an e-mail with the document to the contact (smart object interaction rules are discussed hereinbelow with reference to tables 1, 2, 3);

Zoomable interface—different levels of zoom exist in TIAs 120, the closer the zoom—the more details are visible on each content item 70 and annotations at TIAs 120 may bound to a specific zoom level;

Sharing capabilities—the user can share the information in TIAs 120: single information item 70, information collection or entire TIAs 120, and it may be possible to either share content items 70 as read-only, or in shared collaboration mode.

Figure 5:
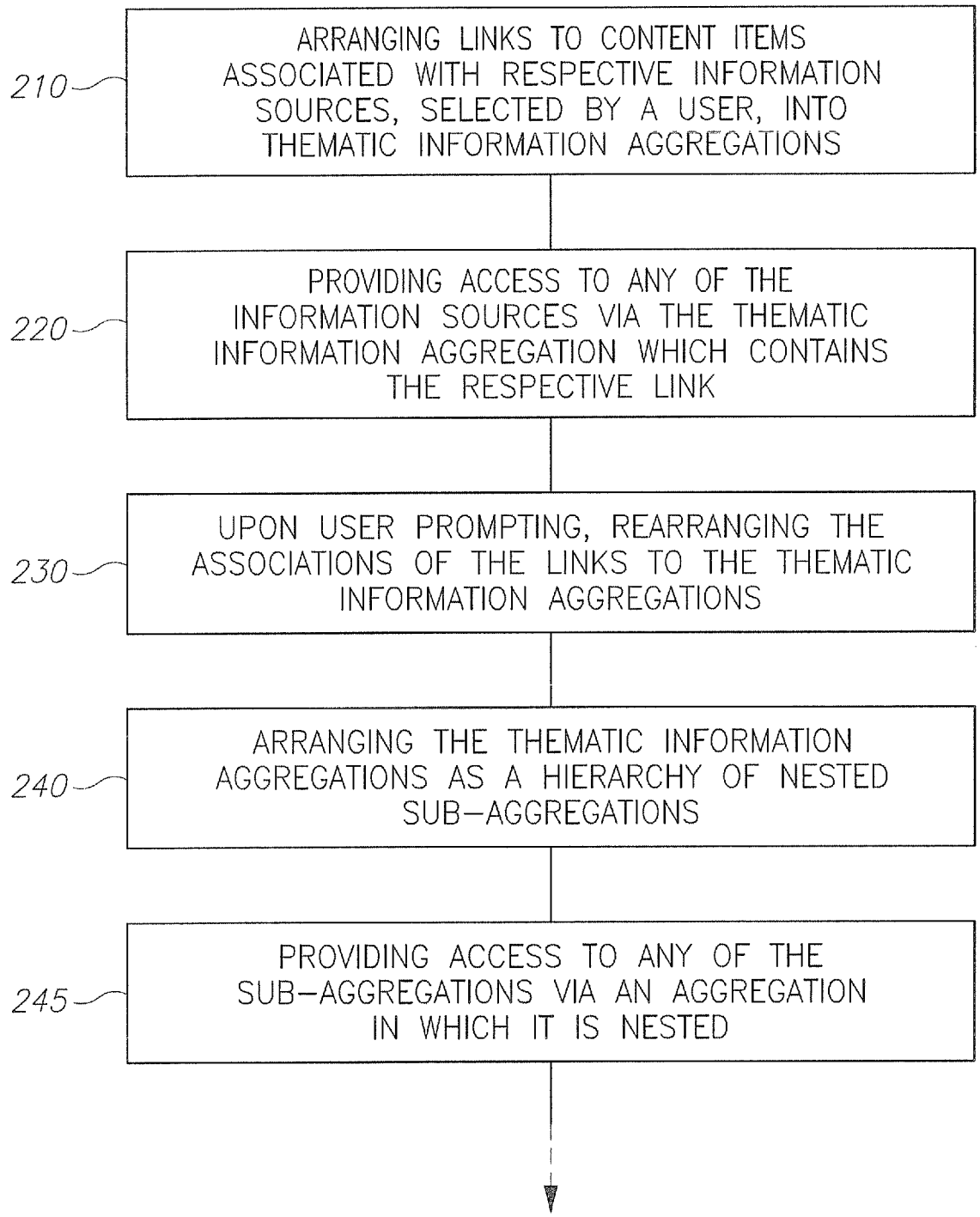
FIG. 5 is a high level flowchart illustrating a method, according to some embodiments of the invention.

FIG. 5 is a high level flowchart illustrating a method 200, according to some embodiments of the invention. Method 200 may include any of the following operations, which may be carried out by at least one computer processor. For example, processor 104, e.g., in communication with input devices 93 (FIG. 1B), may be configured (e.g., by executing software or code) to carry out methods according to embodiments of the present invention. Processor 104 may be configured to carry out the functionality of user interface 110 or other modules discussed herein. Method 200 may include any stage implementable by system 100 and user interface 110, as disclosed in detail above. Certain embodiments include computer program products including a computer readable storage medium having computer readable program embodied therewith and/or instructions stored thereon, which when executed cause a processor to carry out methods according to embodiments of the present invention including but not limited to any of the stages of method 200. The computer readable program and/or instructions may be configured to carry out, at least partially, any of the stages of method 200.

Method 200 includes, using a computer processor, arranging on a display by the means of user selecting and moving, e.g., via touch interface, a plurality of content items or links to content items associated with a plurality of respective information sources, selected by a user, into a plurality of thematic information aggregations (stage 210), providing (using the computer processor) access to any of the content items 70 via the thematic information aggregation which contains the respective content items (stage 220), and, enabling a user to organize (using the computer processor) the associations of the links and respective content items to the thematic information aggregations (stage 230).

Method 200 may further include organizing the thematic information aggregations as a hierarchy of nested sub-aggregations or sub-groups (stage 240), and providing access to any of the sub-aggregations via an aggregation in which it is nested (stage 245) via the means of capturing the navigation state of a TIA 120 and providing a user interface for a user to select a sub-aggregation and restore this navigation state upon user interaction.

Method 200 may further include presenting, graphically, the thematic information aggregations as a map having a plurality of user-selectable and expandable icons, linked to respective thematic information aggregations and content items (stage 250) and optionally configuring the icons to be user-configurable and indicative of the respective thematic information aggregations (stage 255).

Method 200 may further include synchronizing representations of the thematic information aggregations on each of a plurality of user-associated devices (stage 260), and/or maintaining a last or most-recently user-defined configuration of the thematic information aggregations, organized by the user on a most recently used or last-used device, on all the user-associated devices (stage 265).

In certain embodiments, information may be added to a thematic information aggregations (TIA) by registration and selection of respective information sources 80 and content items 70, and addition of respective links 125 into selected TIA 120, either upon user's definition, upon a user's action (e.g., drag and drop) or per default. If necessary, registration of respective information sources 80 may be achieved by prompting a user to select the information source 80 type (e.g. Dropbox, Salesforce.com) and provide user credentials of the respective information source 80. Upon registration either a security/access token provided by the information source 80 based on the supplied user credentials or user credentials themselves may be used in order to access content items 70 available in this information source 80. The respective link 125 and/or content item 70 may be integrated into a respective TIA 120 and associated with other links 125 therein. Information from content item 70 may be used to associate content item 70 to TIA 120. Representation of content item 70 (e.g., an icon thereof) may be organized or resized, for example, using a respective menu (e.g., contextual, case-specific, pop-up etc.). The addition of content item 70 may be synchronized across user's devices 90. Any view of TIA 120 may be captured and added to any other TIA 120 as a content item, and actions may be applied upon content items 70 (e.g., sending in an email). System 100 and interface 110 may include a clipboard function, to and from which a user may move any content item 70, part of TIA 120 or whole TIAs 120 and thus organize TIAs 120. Any magnification of any part of TIAs 120 may be implemented, including multi-stage zooming. System 100 and interface 110 may implement multiple TIAs 120 and their management, allowing creation, removal, renaming, moving and nesting whole TIAs within system 100. Multiple TIAs 120 may be presented simultaneously or be scrolled through.

System 100 and interface 110 may implement state preservation to allow a user to return to a specific location in any of content items 70 according to user definitions or default definitions. System 100 and interface 110 may retain any designation for user last activity and represent TIAs 120 and content items 70 at the respective point in time.

Tables 1-3 schematically exemplify non-limiting embodiments for smart object interaction rules, triggered when content items 70 and containers 410 on TIA 120 are dragged at or over each other (e.g., moved on a display so that they touch or overlap). "Dragging" and other input may be for example via input device(s) 93. Other or different actions, rules, and objects may be used.

TABLE 1

Smart object interactions: single information item into container

| Into Container | Dragged ||||||
|---|---|---|---|---|---|---|
| | Documents & Images | Tasks | Notes | Contacts | E-mails | Web |
| Documents & Images | Move | Create a task with attachment | Create a note with attachment | Creates an email with document attached, where "to" field includes contacts | Create a new email with document | n/a |
| Tasks | n/a | Move | Creates a note from task | Creates an email with task in the body, where "to" field includes contacts | Create a new email with Task | |
| Notes | n/a | Create a task from note | Move | Creates an email with note in the body, where "to" field includes contacts | Create a new email with note | n/a |
| Contacts | Creates an email with all documents as attachments, field "to" contains contact's email. | Create a task mentioning selected person/group | Create a note mentioning selected person/group | Move | n/a | n/a |
| E-mails | Create document containing email body and attachments | Attach message body to task | Creates a note containing email body and attachments | Forward message to contact list | Move | n/a |
| Web | Creates pdf document from page | Create a task with link/ selected text/image attachment from url or pastes URL | Create a note with link/ selected text/image attachment from url | Create an email with Link/Clip/ Image attached/ included, where "to" field includes contacts | Create a new email with Link/ Clip/Image attached/ included | Move |

TABLE 2

Smart object interactions: single information item into single information item in thematic information aggregation.

| Into | Dragged | | | | |
|------|---------|------|---------|--------|-----|
| | Document or Image | Note | Contact | E-mail | Web |
| Document or Image | Create new container | Attaches document to Note | Creates an email where "to" field includes contact, with Document attachment | Create a reply email with Document attachment | n/a |
| Note | n/a | Create new container | Creates an email where "to" field includes contact, with Note in body | Create a reply email with Note | n/a |
| Contact | Create document containing contact info | Creates an email where "to" field includes contact, with Note in body | Create new container | Creates a Reply or FW email where "to" field includes contact | n/a |
| E-mail | n/a | Attaches Email to Note | Creates a Reply or FW email where "to" field includes contact | Create new container | n/a |
| Web clip/Page | n/a | Attaches link/selected text/image to Note or pastes URL into note | Creates an email where "to" field includes contact, with Link/Clip/Image attached/included | Create a reply email with Link/Clip/Image attached/included | n/a |
| Task | n/a | Creates a new container with note and note from task | Creates an email where "to" field includes contact, with Task in body | Create reply email with Task in body | n/a |

TABLE 3

Smart object interactions: single information item into single information item in container.

| Into | Dragged | | | | | |
|------|---------|------|---------|--------|------|-----|
| | Document or Image | Note | Contact | E-mail | Task | Web |
| Document or Image | n/a | Attaches document to Note | Creates an email where "to" field includes contact, with Document attachment | Create a reply email with Document attachment | Attaches document to task | n/a |
| Note | n/a | n/a | Creates an email where "to" field includes contact, with Note in body | Create a reply email with Note | Create sub task from note | n/a |

TABLE 3-continued

Smart object interactions: single information item into single information item in container.

| | Dragged | | | | | |
|---|---|---|---|---|---|---|
| Into | Document or Image | Note | Contact | E-mail | Task | Web |
| Contact | Create document containing contact info | Creates an email where "to" field includes contact, with Note in body | n/a | Creates a Reply or Forward email where "to" field includes contact | Create a task mentioning selected person/ group | n/a |
| E-mail | n/a | Attaches Email to Note | Creates a Reply or Forward email where "to" field includes contact | n/a | Create a sub-task from e-mail | n/a |
| Web clip/ Page | n/a | Attaches link/ selected text/ image to Note or pastes URL into note | Creates an email where "to" field includes contact, with Link/ Clip/Image attached/ included | Create a reply email with Link/Clip/ Image attached/ included | Attaches link/ selected text/ image to Task or pastes URL into Task | n/a |
| Task | n/a | Attaches task to Note | Creates an email where "to" field includes contact, with Task in body | Create reply email with Task in body | Create sub task from task | n/a |

Thus, embodiments of the present invention describe a holistic approach towards information integration, management and visualization on a variety of electronic devices, including but not limited to desktop and portable devices.

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Certain embodiments of the invention may include features from different embodiments disclosed above, and certain embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A data processing system, connected to a plurality of information sources and to a plurality of devices associated with a user, the data processing system comprising:
  a non-transitory memory;
  a processor; and
  one or more adapters, configured to: connect to the plurality of information sources and access content items within the information sources based on prior knowledge of the information structure of the information sources,
  wherein the processor is configured to:
    access, by the one or more adapters, at least two content items of different data structures;
    aggregate links to the at least two content items in a thematic information aggregation (TIA);
    provide, on each of the devices, a user interface comprising at least one TIA, each comprising a plurality of links to content items associated with respective information sources;
    present information from the content items homogenously in one of the at least one TIA, by a common extensible model;

present, in one of the at least one TIA, a plurality of selectable and expandable icons linked to respective content items; and enable, via the user interface, the user to select a content item from the information sources, to add a link to the selected content item to one of the at least one TIA and to access any of the content items via a TIA of the at least one TIA which contains the respective link.

2. The data processing system of claim 1, wherein the thematic information aggregations comprise a hierarchy of nested sub-aggregations, and the processor is further configured to enable, via the user interface, the user to access any of the sub-aggregations via an aggregation in which it is nested.

3. The data processing system of claim 1, further arranged to maintain a last user-defined configuration of the thematic information aggregations, as organized by the user on a last-used device, on all the user-associated devices.

4. The data processing system of claim 1, wherein the thematic information aggregations are graphically presented as a map having a plurality of selectable and expandable icons, linked to respective thematic information aggregations.

5. The data processing system of claim 4, wherein the icons are user configurable and indicative of the respective thematic information aggregations.

6. The data processing system of claim 1, wherein content items are assigned a type of a list of types, comprising at least one of: documents, images, tasks, notes, contacts, emails and web pages, and wherein the processor is configured to perform sets of interactions when displays of content items are dragged at each other according to predefined smart object interaction rules and according to the types of the dragged content item displays, interactions including at least one of:

creation of a container for the content items;
creation of a container for the content items, comprising a note;
creation of a note comprising information from a task;
attachment of at least one object to a note, the object being one of: an email; a link, a uniform resource locator (URL), selected text, a document and an image;
creation of a document comprising contact information;
creation of a reply email wherein the 'to' field comprises specific contact information;
creation of a forward email wherein the 'to' field comprises specific contact information;
creation of an email wherein the 'to' field comprises specific contact information, and wherein the email body comprises at least one object, object being one of: a note, a link, a clip and a task;
creation of a reply email with at least one attached object, the object being one of: a document, a note, a link and a clip; and
creation of a reply email with at least one included object, object being one of: a link, a clip and a task.

7. A method comprising:
displaying on a display a plurality of links to content items selected by a user and associated with a plurality of respective information sources, in a plurality of thematic information aggregations, wherein graphically presenting the thematic information aggregations includes:
connecting, by one or more adapters, to the plurality of information sources and accessing content items within the information sources based on prior knowledge of the information structure of the information sources;
presenting a plurality of selectable and expandable icons linked to respective content items, including at least two content items of different data structures;
providing access to any of the content items in their respective information sources via the thematic information aggregation which contains the respective link, based on prior knowledge of the information structure of the content item;
presenting the information from the content items homogenously, by a common extensible model;
linking different types of information from the plurality of information sources;
enabling a user to organize the associations of the links to the thematic information aggregations; and
synchronizing representations of the thematic information aggregations on each of a plurality of user-associated devices.

8. The method of claim 7, further comprising organizing the thematic information aggregations as a hierarchy of nested sub-aggregations, and providing access to any of the sub-aggregations via an aggregation in which it is nested.

9. The method of claim 7, further comprising presenting, graphically, the thematic information aggregations as a map having a plurality of selectable and expandable icons, linked to respective thematic information aggregations.

10. The method of claim 7, further comprising configuring the icons to be user-configurable and indicative of the respective thematic information aggregations.

11. The method of claim 7, further comprising maintaining a last user-defined configuration of the thematic information aggregations, as organized by the user on a last-used device on each of a plurality of user-associated devices.

12. The method of claim 7, further comprising maintaining a last user-defined configuration of the thematic information aggregations, organized by the user on a last-used device, on all the user-associated devices.

13. The method of claim 7, further comprising:
assigning content items a type from a list of types, the list comprising at least one of: documents, images, tasks, notes, contacts, emails and web pages;
performing sets of interactions when displays of content items are dragged at each other according to predefined smart object interaction rules and according to the types of the dragged content item displays, interactions including at least one of:
creation of a container for the content items;
creation of a container for the content items, comprising a note;
creation of a note comprising information from a task;
attachment of at least one object to a note, object being one of: an email, a link, a uniform resource locator (URL), selected text, a document and an image;
creation of a document comprising contact information;
creation of a reply email wherein the 'to' field comprises specific contact information;
creation of a forward email wherein the 'to' field comprises specific contact information;
creation of an email wherein the 'to' field comprises specific contact information, and wherein the email body comprises at least one object, object being one of: a note, a link; a clip and a task;
creation of a reply email with at least one attached object; object being one of: a document, a note, a link and a clip; and
creation of a reply email with at least one included object, object being one of: a link, a clip and a task.

14. A computer program product comprising a non-transitory memory having stored thereon instructions which when executed cause a processor to:
- connect, by one or more adapters to the plurality of information sources and access content items within the information sources, based on prior knowledge of the information structure of the information source;
- display on a display a plurality of links to content items, selected by a user and associated with a plurality of respective information sources into a plurality of thematic information aggregations, wherein graphically presenting the thematic information aggregations includes presenting a plurality of selectable and expandable icons linked to respective content items, including at least two content items of different data structures;
- provide access to any of the content items in their respective information sources, based on prior knowledge of the information structure of the content item, via the thematic information aggregation which contains the respective link;
- present the information from the content items homogenously, by a common extensible model;
- link different types of information from the plurality of information sources;
- enable a user to organize the associations of the links to the thematic information aggregations; and
- synchronize representations of the thematic information aggregations on each of a plurality of user associated devices.

15. The computer program product of claim 14, wherein the instructions when executed further cause a processor to organize the thematic information aggregations as a hierarchy of nested sub aggregations, and providing access to any of the sub-aggregations via an aggregation in which it is nested.

16. The computer program product of claim 14, wherein the instructions when executed further cause a processor to present; graphically via a user interface, the thematic information aggregations as a map having a plurality of selectable and expandable icons, linked to respective thematic information aggregations.

17. The computer program product of claim 14, wherein the instructions when executed further cause a processor to:
- assign content items a type from a list of types; the list comprising at least one of: documents, images; tasks; notes; contacts, emails and web pages;
- perform sets of interactions when displays of content items are dragged at each other according to predefined smart object interaction rules and according to the types of the dragged content item displays, interactions including at least one of the list of:
- creation of a container for the content items;
- creation of a container for the content items, comprising a note;
- creation of a note comprising information from a task;
- attachment of at least one object to a note, object being one of: an email, a link, a uniform resource locator (URL), selected text, a document and an image;
- creation of a document comprising contact information;
- creation of a reply email wherein the 'to' field comprises specific contact information;
- creation of a forward email wherein the 'to' field comprises specific contact information;
- creation of an email wherein the 'to' field comprises specific contact information, and wherein the email body comprises at least one object, object being one of: a note, a link, a clip and a task;
- creation of a reply email with at least one attached object; object being one of: a document, a note, a link and a clip; and
- creation of a reply email with at least one included object; object being one of: a link, a clip and a task.

18. The method of claim 7, further comprising retrieving and refreshing content items in a thematic information aggregation based on predefined criteria.

19. The method of claim 7, wherein a specific content item is included within more than one thematic information aggregation.

20. The data processing system of claim 1, wherein content items are assigned a type of a list of types, including at least one of: documents, images, tasks, notes, contacts, emails and web pages, and wherein content items are organized in containers; and wherein containers are assigned a specific type of a list of types, including at least one of: documents, images, tasks, notes, contacts, emails and web pages, and wherein the processor is configured to perform sets of interactions when display of a content item is dragged over a display of a container, according to predefined rules and according to the type of the dragged content item and the type of the container; and wherein interactions include at least one of the list of:
- movement at least one content item into a container;
- creation of an email with all documents in a container as attachments, wherein the 'to' field comprises specific contact information;
- creation of a document comprising at least one object, object being one of an email body and an email attachment;
- creation of a pdf document comprising information from a web page; creating a task comprising at least one object, object being one of: a link, selected text, a URL line, a URL of an image from a web page; an email attachment, information from a note, and information relating to a group of at least one selected person;
- attachment of a message body to a task;
- creation of a note comprising at least one object, the object being one of: an email body, an email attachment, a link, information from a task, information relating to a group of at least one selected person, selected text, and a URL of an image from a web page;
- forwarding at least one message to a contact list;
- creation of a new email, wherein the email body comprises at least one object, the object being one of: a link a clip an image a document, a task, and a note;
- creation of a new email, wherein the email body comprises at least one object, the object being one of: a link, a clip, a document, a task and a note, and wherein the 'to' field comprises specific contact information;
- creation of a new email with at least one attached object, object being one of: a link and a clip; and
- creation of a new email with at least one attached object, object being one of: a link, and a clip, and wherein the 'to' field comprises specific contact information.

21. The data processing system of claim 6, wherein content items include dynamic content items, and wherein dynamic content items are selected dynamically according to predefined criteria, and wherein dynamic content items are filtered according to their type and according to predefined rules.

22. The method of claim 7, further comprising:

assigning content items a type from a list of types, including at least one of: documents, images, tasks, notes, contacts, emails and web pages;

organizing content items in containers;

assigning containers a type from a list of types, including at least or of: documents, images, tasks, notes, contacts, emails and web pages; and performing sets of interactions when a display of a content item is dragged over a display of a container, according to predefined rules and according to the type of the dragged content item and the type of the container, wherein interactions include at least one of the list of:

movement of at least one content item into a container;

creation of an email with all documents in a container as attachments, wherein the 'to' field comprises specific contact information;

creation of a document comprising at least one object; object being one of an email body and an email attachment;

creation of a pdf document comprising information from a web page; creation of a task comprising at least one object, object being one of: a link, selected text, a URL line, a URL of an image from a web page, an email attachment, information from a note, and information relating to a group of at least one selected person;

attachment of a message body to a task;

creation of a note comprising at least one object, object being one of: an email body, an email attachment, a link, information from a task, information relating to a group of at least one selected person, selected text, and a URL of an image from a web page;

forwarding of at least one message to a contact list;

creation of a new email, wherein the email body comprises at least one object, object being one of: a link a clip an image a document, a task, and a note;

creation of a new email, wherein the email body comprises at least one object, object being one of: a link, a clip, a document, a task, and a note; and wherein the 'to' field comprises specific contact information;

creation of a new email with at least one attached object, object being one of: a link and a clip; and creation of a new email with at least one attached object, object being one of: a link, and a clip, and wherein the 'to' field comprises specific contact information.

23. The data processing system of claim 1, wherein the one or more devices comprise a plurality of devices associated with a user and wherein the processor is configured to preserve a state of an information item in at least one TIA and synchronize representations of the TIA, across the plurality of devices.

* * * * *